Patented Jan. 16, 1951

2,538,107

UNITED STATES PATENT OFFICE 2,538,107

4 ARYL-4-AMINOMETHYLPIPERIDINE DERIVATIVES AND THEIR PREPARATION

Charles Edward Kwartler, Albany, N. Y., and Philip Lucas, Bristol, Tenn., assignors to Sterling Drug Inc., Wilmington, Del., a corporation of Delaware No Drawing. Application July 30, 1946, Serial No. 687,216

23 Claims. (Cl. 260—294)

1

This invention relates to 4-aryl-4-aminomethylpiperidine derivatives and to a method of preparing the same.

Our new piperidine compounds have the following general formula

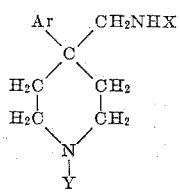

wherein Ar is an aromatic radical, X is a member of the group consisting of acyl radicals and guanyl radicals, and Y is a member of the group consisting of X, hydrogen and monovalent hydrocarbon radicals. These new compounds are valuable pharmacological agents, possessing in relatively varying degree analgesic, antispasmodic, sedative and other activities. For example, in 1-benzyl - 4 - phenyl - 4 - carbethoxyaminomethyl-piperidine hydrochloride analgesic activity is especially marked, while in 1-benzyl-4 - phenyl - 4 - guanidomethylpiperidine sulfate antispasmodic properties predominate.

In the above formula, Ar is an aromatic radical, either carbocyclic or heterocyclic, including phenyl, naphthyl, thienyl, pyridyl, quinolyl, and the like. The aromatic radical may contain various substituents including: hydrocarbon groups, such as alkyl, aralkyl, aryl and the like; halogen atoms, such as chlorine, bromine or iodine; tert-amino groups, such as dimethylamino, piperidyl, morpholino, and the like; ether groups, such as alkoxy, aryloxy, and the like; and other groups which are unaffected by treatment with strong metalating bases, or hydrogen in the presence of hydrogenating catalysts. X is the guanyl group (—C(=NH)NH₂), hydrocarbon substituted guanyl groups, and acyl radicals. The substituted guanyl groups include N-methylguanyl, N,N - diethylguanyl, N,N' - dimethylguanyl, and similar groups where one, or both, of the nitrogen atoms of the guanyl group are linked to lower molecular weight alkyl, aralkyl, or cycloalkyl radicals. The acyl radicals include the following: carbamyl (—CONH₂); N-substituted carbamyl, such as N-ethylcarbamyl, N,N-dimethylcarbamyl, and the like; carbalkoxy, such as carbomethoxy, carbethoxy, carboisobutoxy, carbo-n-hexoxy, and the like; alkanoyl, such as acetyl, isobutyryl, valeryl, cy-

2 clopentanecarbonyl, and the like; and aroyl, such as benzoyl, 4-toluyl, 1-naphthoyl, 2-thenoyl, and the like. Y is a member of the group consisting of hydrogen, X, as defined above, and monovalent hydrocarbon radicals, such as methyl, ethyl, n-butyl, n-hexyl, cyclohexyl, benzyl, phenethyl, phenyl and naphthyl.

In practicing our invention we prefer to use as the group Ar, an aromatic monocarbocyclic radical, which we define as an aromatic radical having a benzene nucleus which may bear substituents such as those indicated above. For the group X we prefer to use the following groups: carbamyl, guanyl, carbalkoxy, and acetyl. For the group Y we prefer to use hydrogen, methyl, benzyl, carbamyl and guanyl.

The compounds of our invention are prepared by the reaction of the appropriate 4-aryl-4-aminomethylpiperidine with an acylating agent or a guanylating agent. These 4-aminomethylpiperidine compounds can be prepared by catalytic hydrogenation of the corresponding 4-cyanopiperidines using Raney nickel in the presence of excess ammonia (see Huber, J. Am. Chem. Soc. 66, 876 (1944)). As starting materials in practicing our invention we prefer to use 4-aryl-4-aminomethylpiperidine derivatives which optionally may contain substituents in the 1-position, said substituents being methyl or benzyl.

Acylation of primary and secondary amines is usually effected by treatment of the amines with acid chlorides. For example, some of the compounds of our invention can be prepared by treatment of the various 4-aminomethylpiperidines with such acid chlorides as: carbamyl chloride (H₂NCOCl); substituted carbamyl chlorides, such as N-methylcarbamyl chloride, N,N-diethylcarbamyl chloride, and the like; alkyl chlorocarbonates, such as methyl chlorocarbonate, ethyl chlorocarbonate, n-butyl chlorocarbonate, isoamyl chlorocarbonate, n-hexyl chlorocarbonate, and the like; alkanoyl chlorides, such as acetyl chloride, isobutyryl chloride, valeryl chloride, and the like; and aroyl chlorides, such as benzoyl chloride, 4-toluyl chloride, 2-thenoyl chloride, 1-naphthoyl chloride, and the like. For example: reaction of carbamyl chloride with 1-phenyl-4-(α-naphthyl)-4-aminomethylpiperidine yields 1-phenyl-4-(α-naphthyl) - 4 - ureidomethylpiperidine; reaction of n-butyl chlorocarbonate with 1-methyl-4-phenyl-4-aminomethylpiperidine gives 1-methyl-4-phenyl-4-carbo - n - butoxyaminomethylpiperidine; and reaction of acetyl chloride with 1- benzyl-4-(β-pyridyl) - 4 - aminomethylpiperidine gives 1-benzyl-4-(β-pyridyl)-4-acetamidomethylpiperidine. If the 1-position of the piperidine nucleus is unsubstituted, acylation will also occur at that position; for example, treatment of 4-phenyl - 4 - aminomethylpiperidine with carbamyl carbide chloride results in the formation of 1-carbamyl-4-phenyl - 4 - ureidomethylpiperidine.

If it is desired to protect the 1-position of the piperidine ring while effecting reaction at the 4-aminomethyl group, this can be achieved by using the 1-benzyl compound for the reaction at the 4-aminomethyl group, and thereafter removing the 1-benzyl group by catalytic hydrogenation in the presence of a palladium catalyst.

While the acylations are usually carried out using acid chlorides, other means, both direct and indirect, can be employed in effecting the introduction of acyl groups. Instead of using acid chlorides, acid anhydrides can be used in some instances; for example, acetic anhydride can be used instead of acetyl chloride. Instead of using carbamyl chloride for the introduction of the carbamyl group, an indirect method can be employed using nitrourea. Thus, heating of an aqueous mixture of a 4-aminomethylpiperidine and a slight excess over theory of nitrourea until the evolution of gas ceases results in the formation of the corresponding 4-ureidomethylpiperidine compound.

Analogously, the 4-guanidomethylpiperidine compounds are prepared by reacting the corresponding 4-aminomethylpiperidine compounds with a guanylating agent, such as cyanamide or an S-methylthiuronium salt. For instance, the 4-guanidomethylpiperidine compounds are easily prepared by heating an aqueous mixture containing equimolecular quantities of a 4-aminomethylpiperidine and an S-methylthiuronium salt (e. g. sulfate, hydroiodide, etc.) until the evolution of gas (methanethiol) ceases. A guanyl group is also introduced into the 1-position of the piperidine ring if that position is unsubstituted. Thus, the reaction of S-methylthiuronium sulfate with 4-phenyl-4-aminomethylpiperidine yields 1-guanyl-4-phenyl-4-guanidomethylpiperidine sulfate. Analogously, N-mono-, di-, or tri-(hydrocarbon radical)-substituted - S - methylthiuronium salts yield the corresponding substituted guanyl derivatives.

The following examples are presented to illustrate further our invention, but without any intention of limiting the scope of said invention thereto.

Example 1

(a) 1 - methyl-4-phenyl-4-aminomethylpiperidine.—A solution of 36 g. of 4-cyano-1-methyl-4-phenylpiperidine in 400 ml. of 15% methanolic ammonia is treated for 20 hours with 500 lbs. of hydrogen at room temperature in the presence of 10 g. of Raney nickel. After the catalyst has been filtered off, the filtrate is distilled to yield about 25 g. of 1-methyl-4-phenyl-4-aminomethylpiperidine, B. P. 170–2° C. (12.5 mm.).

The dihydrochloride of this compound is prepared by treatment of an ether solution of the diamine with dry hydrogen chloride, M. P. 287–8° C.

(b) 1 - methyl-4-phenyl-4-ureidomethylpiperidine.—A mixture of 7.3 g. of 1-methyl-4-phenyl-4-aminomethylpiperidine and 4.8 g. of nitrourea in 150 ml. of water is heated to 90° C. until gas evolution ceases. The solution is concentrated in vacuo to yield about 10 g. of solid. Recrystallization of this material from pyridine with charcoaling yields about 7 g. (after drying at 100° C.) of 1-methyl-4-phenyl-4-ureidomethylpiperidine, M. P. 200–201° C.

Use of 1-methyl-4-(3,5-dimethoxyphenyl)-4-aminomethylpiperidine or 1-methyl-4-(α(-naphthyl)-4-aminomethylpiperidine in place of 1-methyl-4-phenyl-4-aminomethylpiperidine in the preceding example gives, as final products, 1-methyl-4-(3,5-dimethoxyphenyl)-4-ureidomethylpiperidine or 1-methyl-4-(α(-naphthyl)-4-ureidomethylpiperidine, respectively.

Example 2

1-benzyl-4-phenyl-4-ureidomethylpiperidine.—A mixture of 30 g. of 1-benzyl-4-phenyl-4-aminomethylpiperidine (preparation given by W. Huber, J. Am. Chem. Soc. 66, 876 (1944)) and 14.4 g. of nitrourea is dissolved in 450 ml. of warm water and heated to 90° C. until evolution of gas ceases. A solid separates and, after cooling, it is collected by filtration and recrystallized from acetone-water to yield about 19 g. of 1-benzyl-4-phenyl-4-ureidomethylpiperidine, M. P. 172–3° C.

Instead of using 1-benzyl-4-phenyl-4-aminomethylpiperidine in the above example, other corresponding 4-aryl derivatives can be used. For example, the use of 1-benzyl-4-(p-methoxyphenyl)-4-aminomethylpiperidine or 1-benzyl-4-(α-naphthyl)-4-aminomethylpiperidine yields 1-benzyl-4-(p-methoxyphenyl)-4 - ureidomethylpiperidine or 1-benzyl-4-(α-naphthyl)-4-ureidomethylpiperidine, respectively.

Example 3

(a) 4-phenyl-4-aminomethylpiperidine.—A solution of 55 g. of 4-cyano-4-phenylpiperidine is treated with 500 lbs. of hydrogen for 14 hours at room temperature in the presence of 20 g. of Raney nickel. After removal of the catalyst by filtration, the filtrate is distilled in vacuo to yield about 47 g. of 4-phenyl-4-aminomethylpiperidine, B. P. 154° C. at 4 mm.

Treatment of an ether solution of the distilled base with alcoholic hydrogen chloride yields the dihydrochloride, M. P. 252–4° C.

4-phenyl-4-aminomethylpiperidine can also be prepared by catalytic hydrogenation of 1-benzyl-4-phenyl-4-aminomethylpiperidine in the presence of palladium sponge.

(b) 1-carbamyl-4-phenyl - 4 - ureidomethylpiperidine.—A mixture of 11.2 g. of 4-phenyl-4-aminomethylpiperidine, 14 g. of nitrourea and 140 ml. of water is kept at 70° C. for 30 minutes after which time evolution of gas has ceased and dissolution has resulted. The solvent is removed in vacuo and the residue is recrystallized twice from pyridine with charcoaling yielding about 11 g. of 1-carbamyl-phenyl-4-ureidomethylpiperidine, M. P. 205–6° C. (dec.).

Example 4

4-phenyl-4-ureidomethylpiperidine. — A solution of 12.5 g. of 1-benzyl-4-phenyl-4-ureidomethylpiperidine in 10 ml. of water, 50 ml. of 95% ethanol and 8 ml. of glacial acetic acid is treated with 45 lbs. of hydrogen at 50–60° C. over 0.4 g. of $PdCl_2$ and 2 g. of charcoal. After removal of the catalyst by filtration, the filtrate is concentrated in vacuo to a small volume which is dissolved in water and made alkaline to phenolphthalein to bring about crystallization. This material is filtered, washed with water, and recrystallized from water yielding 4-phenyl-4-ureidomethylpiperidine, M. P. 186–7° C. (dec.).

Example 5

*1-benzyl-4-phenyl-4-guanidomethylpiperidine sulfate.*—A mixture of 14 g. of 1-benzyl-4-phenyl-4-aminomethylpiperidine, 7 g. of S-methylthiuronium sulfate, and 50 ml. of water is stirred at room temperature for 15 hours, and then heated on a steam bath for one hour. The resulting solution is charcoaled and chilled, yielding a solid which, after being recrystallized from water, melted at 122–5° C. After drying at 100° C., a vitreous material was obtained that melted about 150° C. and analyzed satisfactorily for 1-benzyl-4 - phenyl - 4 - guanidomethylpiperidine sulfate ($C_{20}H_{26}N_4 \cdot \frac{1}{2}H_2SO_4$).

Instead of using 1-benzyl-4-phenyl-4-aminomethylpiperidine in the above example, 1-benzyl-4 - (o-methoxyphenyl) -4-aminomethylpiperidine or 1-benzyl - 4 - (α-naphthyl) -4-aminomethylpiperidine can be substituted resulting in the formation of the sulfates of 1-benzyl-4-(o-methoxyphenyl) -4-guanidomethylpiperidine or 1-benzyl-4 - (α-naphthyl) -4-guanidomethylpiperidine, respectively.

Example 6

*1-guanyl-4-phenyl-4-guanidomethylpiperidine sulfate.*—A mixture of 3.8 g. of 4-phenyl-4-aminomethylpiperidine and 5.6 g. of S-methylthiuronium sulfate in 10 ml. of water is kept at room temperature for 15 hours, and is slowly heated to boiling whereupon crystallization results. After cooling the reaction mixture, the crystals are filtered and dried to yield about 3.5 g. of 1-guanyl - 4 - phenyl-4-guanidomethylpiperidine sulfate ($C_{14}H_{22}N_6 \cdot H_2SO_4$), M. P. 363–5° C. (dec.). Recrystallization of a sample from water did not change the melting point.

Example 7

*1-methyl-4-phenyl-4-carbethoxyaminomethylpiperidine.*—To a solution of 8.16 g. of 1-methyl-4-phenyl-4-aminomethylpiperidine in 75 ml. of dioxane is added 8.3 g. of finely powdered, anhydrous potassium carbonate. A solution of 4.34 g. of ethyl chlorocarbonate in a small volume of dioxane is added dropwise over a period of 25 minutes and the resulting mixture is refluxed for 90 minutes, filtered hot and concentrated in vacuo to a small volume. Addition of petroleum ether precipitates a small quantity of gummy material which solidified on triturating and chilling. This small portion of crude product is filtered, and the filtrate is further evaporated in vacuo to yield the main portion of the product. After triturating the residue with petroleum ether, the white solid, 1-methyl - 4 - phenyl-4-carbethoxyaminomethylpiperidine, is filtered and dried, M. P. 86–8° C.

Example 8

*1 - benzyl - 4 - phenyl - 4 - carbomethoxyaminomethylpiperidine hydrochloride.*—A solution of 14 g. of 1-benzyl-4-phenyl-4-aminomethylpiperidine in 50 ml. of benzene is treated dropwise with 5.2 g. of methyl chlorocarbonate in 25 ml. of benzene (with cooling), and the resulting mixture is refluxed, with stirring, for 30 minutes. After cooling the reaction mixture, the crystalline precipitate is filtered, washed with ether and air-dried at 100° C. to yield about 16 g. of product melting at 202–3° C. (dec.). Two recrystallizations from isopropanol with charcoaling, raises the melting point of this salt, 1-benzyl-4 - phenyl - 4 - carbomethoxyaminomethylpiperidine hydrochloride, to 211° C. (with dec.).

Example 9

*1 - benzyl - 4 - phenyl - 4 - carbethoxyaminomethylpiperidine hydrochloride.*—To a solution of 11.2 g. of 1-benzyl-4-phenyl-4-aminomethylpiperidine dissolved in 50 ml. of pyridine is added dropwise 4.34 g. of ethyl chlorocarbonate dissolved in a little ether, keeping the temperature at 25–35° C. during the addition by external cooling when necessary. The clear solution is heated at 60–65° C. for one hour, cooled, filtered, and the crystalline product is washed with ether and air dried to yield 1.5 g. of material melting at 231–3° C. The main portion of the product is obtained by subjecting the pyridine mother liquor to vacuum distillation. The resulting residue is washed with ether and air dried to give about 9 g. of material melting at 222–4° C. A recrystallization from pyridine, with charcoaling, raises the M. P. to 233–235° C.; this product is 1-benzyl-4-phenyl-4-carbethoxyaminomethylpiperidine hydrochloride.

In the above example, 1-benzyl-4-phenyl-4-aminomethylpiperidine can be substituted by 1-benzyl - 4 - (m-methoxyphenyl) -4-aminomethylpiperidine or 1-benzyl-4-(α-naphthyl) -4-aminomethylpiperidine resulting in the formation of the hydrochloride salts of 1-benzyl-4-(m-methoxyphenyl) -4-carbethoxymethylpiperidine or 1-benzyl - 4 - (α-naphthyl) -4-carbethoxymethylpiperidine, respectively.

Example 10

*1 - benzyl-4-phenyl-4-carbo-n-propoxyaminomethylpiperidine hydrochloride.*—This preparation is carried out like Example 8, but using 14 g. of 1-benzyl - 4 - phenyl-4-aminomethylpiperidine dissolved in 50 ml. of benzene and 6.8 g. of n-propyl chlorocarbonate dissolved in 25 ml. of benzene. About 17 g. of crude product, melting (with dec.) at 217–9° C. is obtained. A recrystallization from isopropanol, with charcoaling, raised the melting point (with dec.) to 221–3° C.; this product is 1-benzyl-4-phenyl-4-carbo-n-propoxyaminomethylpiperidine hydrochloride.

Example 11

*1-benzyl - 4 - phenyl-4-carbo-n-butoxyaminomethylpiperidine hydrochloride.*—This preparation is carried out like Example 8, but using 7.5 g. of n-butyl chlorocarbonate in place of the methyl chlorocarbonate. The purified product, 1-benzyl-4 - phenyl-4-carbo-n-butoxyaminomethylpiperidine hydrochloride, weighs about 10 g. and melts at 208–209° C. The pH of a 1% solution is 5.5.

Example 12

*1 - benzyl-4-phenyl-4-carbo-iso-butoxyaminomethylpiperidine hydrochloride.*—This preparation is carried out like Example 8, but using 7.5 g. of iso-butyl chlorocarbonate in place of the methyl chlorocarbonate. The purified product, 1 - benzyl - 4 - phenyl-4-carbo-iso-butoxyaminomethylpiperidine hydrochloride, weighs about 16 g. and melts at 227° C. The pH of 1% solution is 6.

Example 13

*1-benzyl-4-phenyl-4-carbo-n - amyloxyaminomethylpiperidine hydrochloride.*—This preparation is run like Example 8, but using 8.3 g. of n-amyl chlorocarbonate in place of the methyl chlorocarbonate. The purified product, 1-benzyl-4-phenyl-4-carbo-n-amyloxyaminomethylpiperidine hydrochloride, weighs about 15 g. and melts at 205–6° C. The pH of a 0.5% solution is 5.7.

*Example 14*

*1-benzyl-4-phenyl-4-carbo-n-hexyloxyaminomethylpiperidine hydrochloride.*—This preparation is run like Example 8, but using 9.1 g. of n-hexyl chlorocarbonate in place of the methyl chlorocarbonate. The purified product, 1-benzyl-4-phenyl-4-carbo-n-hexyloxy-aminomethylpiperidine hydrochloride, weighs about 10 g. and melts at 193–4° C.

*Example 15*

*4-acetamidomethyl-1-benzyl-4-phenylpiperidine hydrochloride.*—A solution of 14 g. of 1-benzyl-4-phenyl-4-aminomethylpiperidine in 50 ml. of benzene is treated dropwise with a solution of 4.3 g. of acetyl chloride in 25 ml. of benzene keeping the temperature about 30–35° C. The mixture is refluxed for 30 minutes and cooled; the product is filtered, washed with ether, and recrystallized from 95% ethanol with charcoaling yielding about 12 g. of 4-acetamidomethyl-1-benzyl-4-phenylpiperidine hydrochloride, M. P. 271–273° C. The pH of a 1% solution is 5.8.

Our 4-aryl-4-aminomethylpiperidine derivatives have essentially the same physiological properties whether employed as the free bases, which are the active components, or—and often more conveniently—as their salts with either inorganic or organic acids; so it will be understood that the free bases and their salts are equivalents with respect to the instant invention. Among the acids which may be employed to form the salts are sulfuric, hydrochloric, hydrobromic, phosphoric, sulfamic, or other inorganic acids, as well as acetic, citric, benzoic, cinnamic or other organic acids.

We claim:

1. A compound having the formula

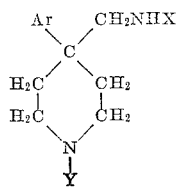

wherein Ar is a member of the group consisting of radicals of the benzene, naphthalene, thiophene, pyridine and quinoline series, X is a member of the group consisting of carbalkoxy radicals, carbamyl radicals and guanyl radicals, and Y is a member of the group consisting of X, hydrogen and monovalent hydrocarbon radicals having from 1 to 10 carbons atoms; and acid addition salts thereof.

2. A compound having the formula

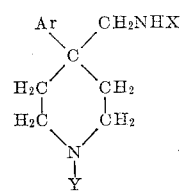

wherein Ar is a monocarbocyclic aromatic radical having six ring-carbon atoms, X is a carbamyl radical, and Y is a hydrocarbon radical having from 1 to 10 carbon atoms; and acid-addition salts thereof.

3. A compound having the formula

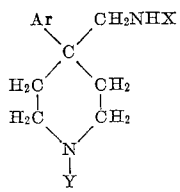

wherein Ar is a monocarbocyclic aromatic radical having six ring-carbon atoms, X is a carbalkoxy radical, and Y is a hydrocarbon radical having from 1 to 10 carbon atoms; and acid-addition salts thereof.

4. A compound having the formula

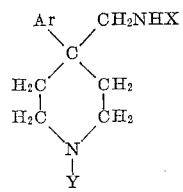

wherein Ar is a monocarbocyclic aromatic radical having six ring-carbon atoms, X is a guanyl radical, and Y is a hydrocarbon radical having from 1 to 10 carbon atoms; and acid-addition salts thereof.

5. A compound having the formula

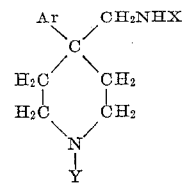

wherein Ar is a monocarbocyclic aromatic radical having six ring-carbon atoms, X is a carbamyl radical, and Y is an aralkyl radical having six ring-carbon atoms; and acid-addition salts thereof.

6. A compound having the formula

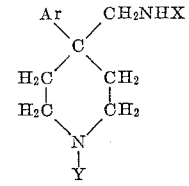

wherein Ar is a monocarbocyclic aromatic radical having six ring-carbon atoms, X is a carbalkoxy radical, and Y is an aralkyl radical having six ring-carbon atoms; and acid-addition salts thereof.

7. A compound having the formula

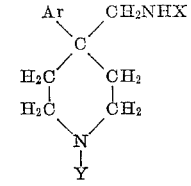

wherein Ar is a monocarbocyclic aromatic radical having six ring-carbon atoms, X is a guanyl radical, and Y is an aralkyl radical having six ring-carbon atoms; and acid-addition salts thereof.

8. 1-benzyl-4-phenyl-4-ureidomethylpiperidine.

9. 1-benzyl-4-phenyl-4-guanidomethylpiperidine, which in the form of its sulfate salt melts at about 150° C.

10. 1-benzyl-4-phenyl-4-carbethoxyaminomethylpiperidine, which in the form of its hydrochloride salt melts at about 233–235° C.

11. A process for the preparation of the compound having the formula

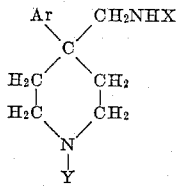

wherein Ar is a member of the group consisting of radicals of the benzene, naphthalene, thiophene, pyridine and quinoline series, X is a member of the group consisting of carbalkoxy radicals, carbamyl radicals and guanyl radicals, and Y is a member of the group consisting of X, hydrogen and monovalent hydrocarbon radicals having from 1 to 10 carbon atoms, which comprises heating a compound having the formula

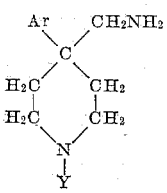

with a member of the group consisting of carbalkoxylating agents, carbamylating agents and guanylating agents.

12. A process for the preparation of the compound having the formula:

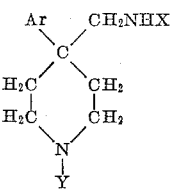

wherein Ar is a monocarbocyclic aromatic radical having six ring-carbon atoms, X is a carbalkoxy radical and Y is a monovalent hydrocarbon radical having 1 to 10 carbon atoms, which comprises heating a compound having the formula:

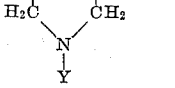

with a carbalkoxylating agent.

13. A process for the preparation of the compound having the formula

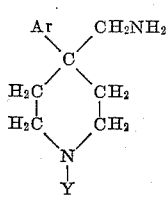

wherein Ar is a monocarbocyclic aromatic radical having six ring-carbon atoms, X is a guanyl radical, and Y is a monovalent hydrocarbon radical having from 1 to 10 carbon atoms, which comprises heating a compound having the formula

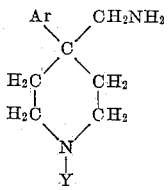

with a guanylating agent.

14. A process for the preparation of the compound having the formula

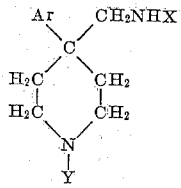

wherein Ar is a monocarbocyclic aromatic radical having six ring-carbon atoms, X is a carbalkoxy radical, and Y is a hydrocarbon radical having from 1 to 10 carbon atoms, which comprises heating a compound having the formula

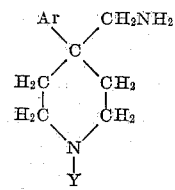

with an alkyl chlorocarbonate.

15. A process for the preparation of the compound having the formula

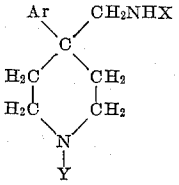

wherein Ar is a monocarbocyclic aromatic radical having six ring-carbon atoms, X is a carbalkoxy radical, and Y is an aralkyl radical having six ring-carbon atoms, which comprises heating a compound having the formula

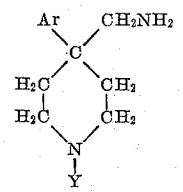

with an alkyl chlorocarbonate.

16. A process for the preparation of 1-benzyl-4-phenyl-4-ureidomethylpiperidine which comprises heating 1-benzyl-4-phenyl-4-aminomethylpiperidine with nitrourea.

17. A process for the preparation of 1-benzyl-4-phenyl-4-guanidomethylpiperidine which comprises heating 1-benzyl-4-phenyl-4-aminomethylpiperidine with S-methylthiuronium sulfate.

18. A process for the preparation of 1-benzyl-4-phenyl-4-carbethoxyaminopiperidine, which comprises heating 1-benzyl-4-phenyl-4-aminomethylpiperidine with ethyl chlorocarbonate.

19. A process for the preparation of the compound having the formula

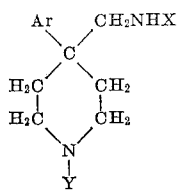

wherein Ar is a monocarbocyclic aromatic radical having six ring-carbon atoms, X is a carbamyl radical and Y is a monovalent hydrocarbon radical having 1 to 10 carbon atoms, which comprises heating a compound having the formula

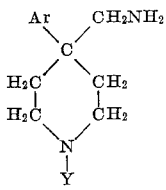

with a carbamylating agent.

20. 1-benzyl-4-phenyl-4-carbo-n-butoxyaminomethylpiperidine, which in the form of its hydrochloride salt melts at 208–209° C.

21. 1-benzyl-4-phenyl-4-carbo-n-amyloxyaminomethylpiperidine, which in the form of its hydrochloride salt melts at 205–206° C.

22. A process for the preparation of 1-benzyl-4-phenyl-4-carbo-n-butoxyaminomethylpiperidine which comprises heating 1-benzyl-4-phenyl-4-aminomethylpiperidine with n-butyl chlorocarbonate.

23. A process for the preparation of 1-benzyl-4-phenyl-4-carbo-n-amyloxyaminomethylpiperidine which comprises heating 1-benzyl-4-phenyl-4-aminomethylpiperidine with n-amyl chlorocarbonate.

CHARLES EDWARD KWARTLER.
PHILIP LUCAS.

REFERENCES CITED

The following references are of record in the file of this patent:

UNITED STATES PATENTS

| Number | Name | Date |
|---|---|---|
| 2,326,497 | Riester et al. | Aug. 10, 1943 |

FOREIGN PATENTS

| Number | Country | Date |
|---|---|---|
| 537,302 | Germany | Nov. 6, 1931 |

OTHER REFERENCES

Zart: Chem. Abstracts, vol. 13 (1919), p. 1828.
Nienburg: Chem. Abstracts, vol. 31 (1937), pp. 4319 and 4320.
Ochiai: Chem. Abstracts, vol. 34 (1940), p. 5450.
Kabochnik et al.: Chem. Abstracts, 35 (1941), p. 3641.
Bergel etl al.; Jour. Chem. Soc., London, p. 265 (1944).
Huber: Jour. Amer. Chem. Soc., 66, p. 876 (1944).
Reihlen et al.: Chem. Abstracts, vol. 26, p. 1898.

Certificate of Correction

Patent No. 2,538,107 January 16, 1951

CHARLES EDWARD KWARTLER ET AL.

It is hereby certified that error appears in the printed specification of the above numbered patent requiring correction as follows:

Column 3, line 7, strike out the word "carbide"; column 4, line 59, for "1-carbamyl-phenyl" read *1-carbamyl-4-phenyl*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*